United States Patent Office 3,473,114
Patented Oct. 14, 1969

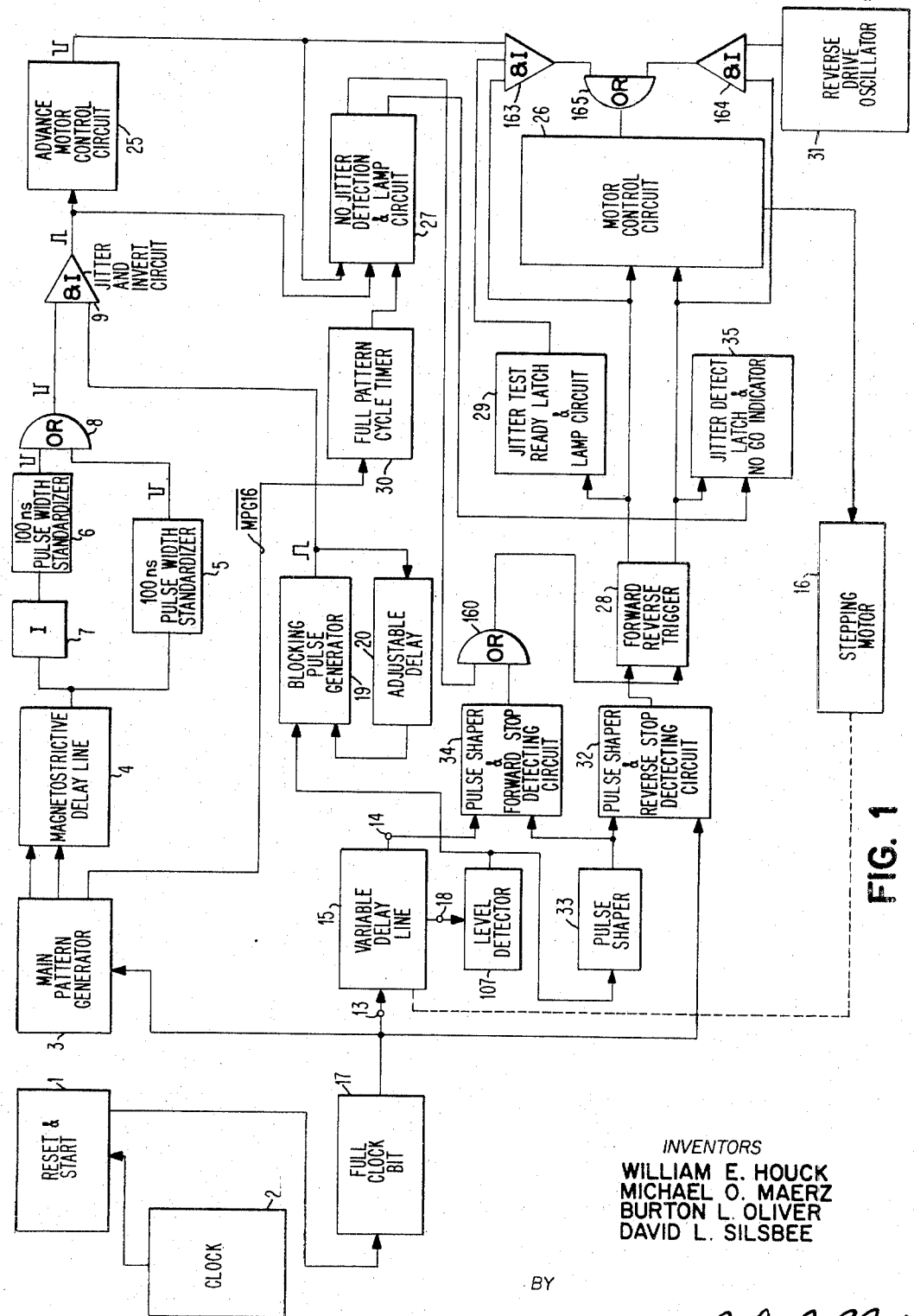

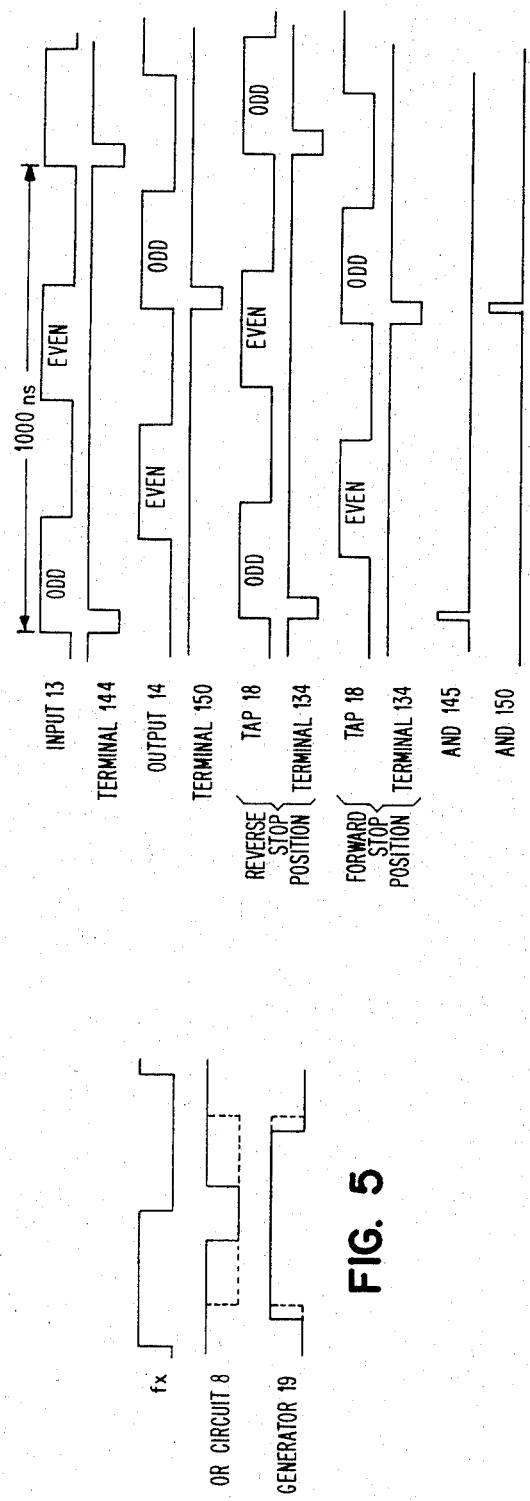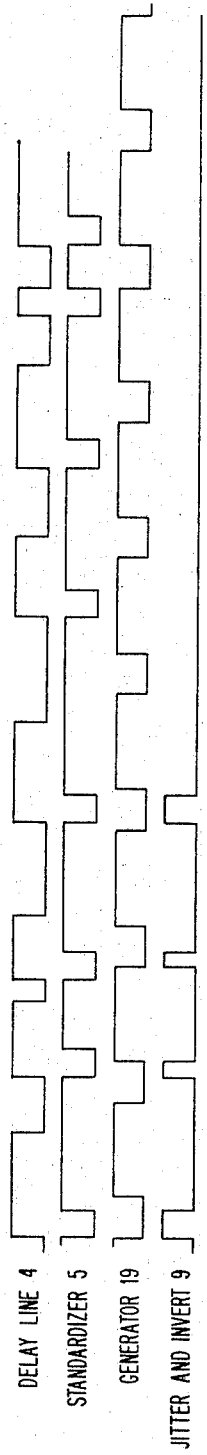

3,473,114
METHOD AND APPARATUS FOR TESTING MAG-
NETOSTRICTIVE DELAY LINES BY CHECKING
FOR SIGNAL COINCIDENCE BETWEEN SIGNAL
PULSES AND REFERENCE PULSES IN DIFFER-
ENT PHASE POSITIONS OF THE REFERENCE
PULSES
William E. Houck, Endicott, and Michael O. Maerz,
Binghamton, N.Y., and Burton L. Oliver, Milo, Maine,
and David L. Silsbee, Owego, N.Y., assignors to International Business Machines Corporation, Armonk,
N.Y., a corporation of New York
Filed Dec. 29, 1966, Ser. No. 605,754
Int. Cl. G01r 11/00; H03k 5/20
U.S. Cl. 324—68                                                13 Claims

ABSTRACT OF THE DISCLOSURE

Maximum jitter in the output of a magnetostrictive delay line is produced by repetitively applying a selected pulse pattern. The phases of the resultant output pulses are compared in a logical circuit with cyclical blocking pulses having a pulse width equal to that of the output pulses plus the maximum jitter specification of the delay line. The phase of the blocking pulses is incrementally varied; and if the maximum jitter in the output of the delay line under test does not exceed specifications, all of the output pulses will be "blocked" from passing through the logical circuit in at least one phase position.

---

Figure 2A:
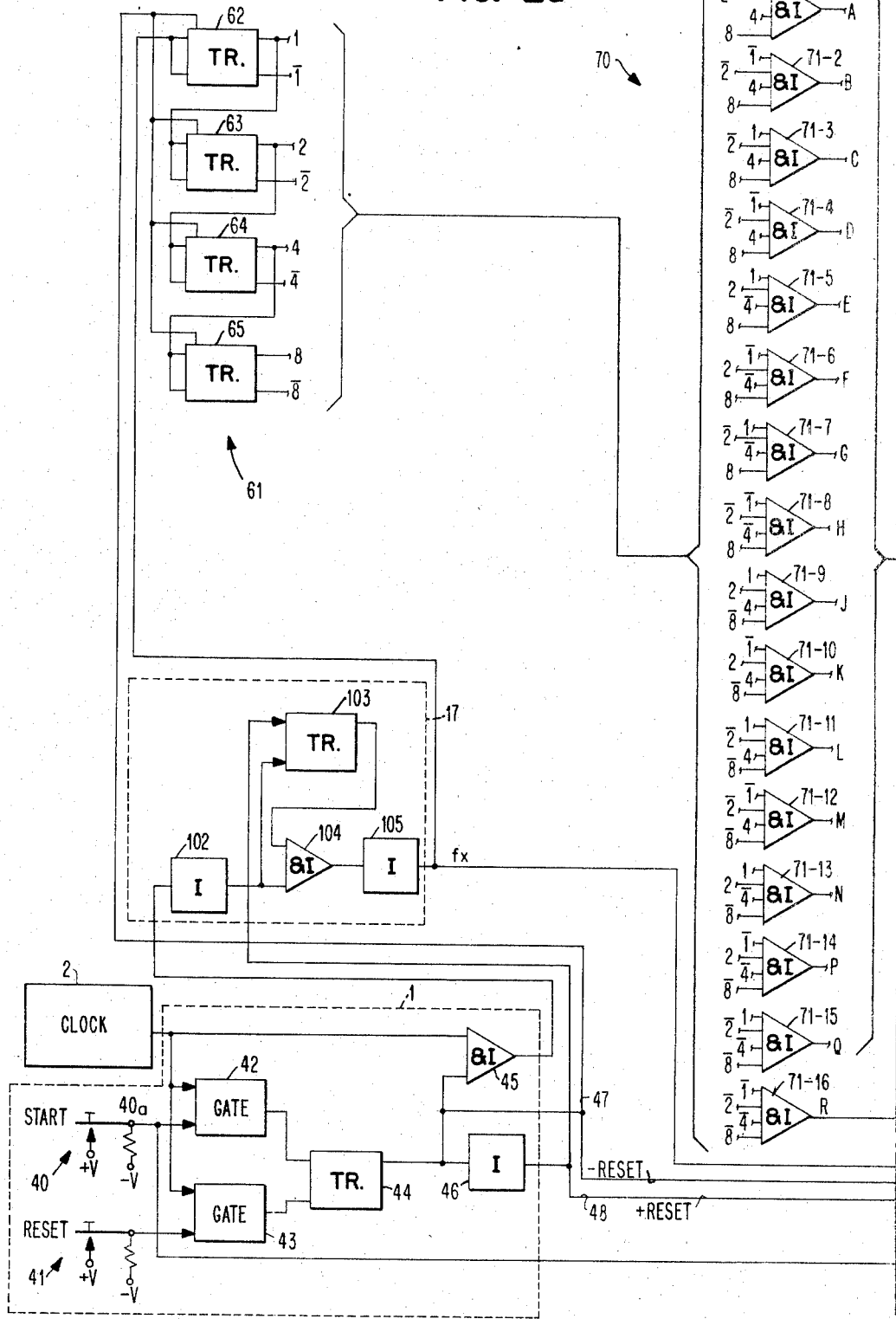

This invention relates generally to an improved method and means for determining whether or not the amount of jitter in received electrical pulses exceeds predetermined test specifications, and more particularly to an improved automatic apparatus for testing for jitter in magnetostrictive delay lines and the like.

Maximum jitter in the output of a magnetostrictive delay line is produced by repetitively applying a selected pulse pattern. The phases of the resultant output pulses are compared in a logical circuit with cyclical blocking pulses having a pulse width equal to that of the output pulses plus the maximum jitter specification of the delay line. The phase of the blocking pulses is incrementally varied; and if the maximum jitter in the output of the delay line under test does not exceed specifications, all of the output pulses will be "blocked" from passing through the logical circuit in at least one phase position.

In a United States patent application, Ser. No. 606,363, filed on Dec. 30, 1966 by B. L. Oliver, one of the co-inventors herein, identified as Docket EN966018 and assigned to the same assignee as the present application, there is described an improved method and means for checking magnetostrictive delay lines and the like for excessive jitter conditions; and said application is incorporated herein by reference as if it were set forth in its entirety.

In data transmission apparatus, magnetostrictive delay lines, and the like, data pulses having a predetermined phase and pulse width are applied to the input to the system. It would be desirable if these pulses were received at the output of the system undistorted with respect to both phase and pulse width. However, it is well known that both the phase and the width of the pulses become distorted during the transmission from the input to the output. It is further recognized that the distortion which is introduced at the output is determined in part by the pattern of the pulses generated. Different pulse sequences will have a greater or less effect upon the distortion introduced at the output. This distortion is frequently referred to as "jitter."

When magnetostrictive delay lines are used as storage devices, the data received at the output of the line is frequently recirculated in storage by re-applying the data to the input. When the delay line is used in this manner, the output data pulses must be restored to the same pulse width and their phase must be re-timed so that they occur with the same time relation to each other at the input. Only then can they be recirculated. For the pulses to be re-timed, each pulse must occur during a specified clock period; furthermore, it must be guaranteed that, with maximum jitter, the output pulse will still occur during its particular clock cycle. If jitter were the only condition that caused variations in the timing, the whole period of a clock cycle could be used to re-time the output pulse. However, other conditions which need not be described here, enter into the problem so that only a part of each clock cycle can be allotted to jitter variation. For this reason, a delay line must have less than a specified maximum level of jitter.

This jitter problem becomes extremely critical in the operation of magnetostrictive delay lines, particularly at very high frequencies in the order of one megacycle. The problem is so severe that where high quality operation of the apparatus is required, each and every delay line must be very carefully inspected to determine whether or not the worst case jitter for any and all patterns exceeds specifications.

So far as is known, the method commonly utilized was a manual-operator technique which involved the use of a data pulse pattern generator connected to the input of a delay line and an oscilloscope connected to the output of the delay line to receive the output pulses derived from the pattern. The output pulses were superimposed upon each other on the oscilloscope screen, and the operator visually determined whether or not the maximum jitter introduced in the output exceeded predetermined specifications. This method, however, is extremely inaccurate and suffers greatly from problems related to operator fatigue, operator error and difficulty is visually observing the extremities of the pulses applied to the oscilloscope screen because of various light intensities for different pulses and because of the fading of the pulses with time.

With the advent of stricter requirements for magnetostrictive delay lines to be used as data storage devices in electronic data processing apparatus, the previous manual techniques described above become completely inadequate. The requirements for accuracy of operation are too great for reliance upon such an inaccurate method. In addition, the time required for inspecting each and every delay line was excessive.

In the above said Oliver application, means including a clock and a pattern generator are provided for applying a selected serial pattern of pulses to the magnetostrictive delay line under test for producing a maximum jitter condition. The output pulses from the delay line are standardized with respect to pulse width and applied to one input of a logical AND circuit. The clock pulses are applied to a variable delay line to produce pulses of short time duration, the phase of which is variable. The output pulses from the variable delay line are applied to a second input to the logical AND circuit. In each selected setting of the variable delay line, the entire pattern of pulses is applied to the magnetostrictive delay line. The amount of delay (phase displacement) which is introduced from input to output in the variable delay line is selectively increased until at least one of the output pulses from the variable delay line coincides in time with at least one of the standardized output pulses from the magnetostrictive delay line under test. Satisfaction of the logical AND circuit input requirement determines this overlapping or coincidence condition. The amount of delay in the variable delay line is further increased until such time as the coincidence condition between the output signals from the variable delay line and the magnetostrictive delay line no longer exists. The variation in the variable delay line adjustment from the satisfaction and subsequent non-satisfaction of the logical AND condition is a measure of the amount of jitter introduced into the output pulses of the magnetostrictive delay line plus a correction factor, i.e. the standardized output pulse width of the magnetostrictive delay line plus the standardized pulse width of the output pulses of the variable delay line. The same procedure is followed to measure the correction factor, with one exception; i.e. only widely spaced single pulses are applied to the magnetostrictive delay line so that substantially no jitter is introduced into the output of the magnetostrictive delay line. The time interval between the satisfaction and non-satisfaction of the coincidence condition is the correction factor representing the sum of the pulse width of the standardized output signal of the magnetostrictive delay line without jitter and the pulse width of the output of the variable delay line. Subtraction of (1) the correction factor from (2) the measured jitter plus correction factor is performed to determine the maximum jitter present.

It is the primary object of the present invention to provide an improved method and means for automatically testing for the maximum jitter conditions in the output of a magnetostrictive delay line or the like which lends itself readily to completely automatic operation.

This object is achieved in a preferred embodiment of the present invention by providing a clock cooperating with a main pattern generator to apply pulse trains to the magnetostrictive delay line under test. The corresponding output pulses from the delay line are applied to a re-shaping network which produces an output pulse of constant width for each output voltage change of one or both polarities. This constant width pulse is applied to one input of a logical AND circuit.

The clock pulses are also applied to a stepping delay line which is controlled by a stepping motor to produce output pulses delayed in time as a function of the position of a movable tap in the delay line which tap is controlled by the stepping motor. The output pulses from the variable delay line are applied to a blocking pulse generator.

The blocking pulse generator produces one blocking pulse for each output pulse from the tap on the variable delay line. The width of the blocking pulse is equal to the width of the re-shaped output pulse from the magnetostrictive delay line plus the maximum value of permissible jitter. This blocking pulse is applied to the other input of the logical AND circuit.

The logical AND circuit produces an output only when the blocking pulse (which is wider than the magnetostrictive delay line output pulse) does not completely cover a corresponding re-shaped magnetostrictive delay line output pulse. That is, the blocking pulse must be initiated prior to the leading edge of the output pulse from the magnetostrictive delay line and it must terminate subsequent to the termination of the magnetostrictive delay line output pulse to prevent an output pulse in the AND circuit. If a portion of the re-shaped magnetostrictive delay line output pulse exists before or after the blocking pulse, then the AND gate produces an output pulse. This output pulse is utilized to cause a control circuit to energize the stepping motor to move the variable tap one incremental step. The AND gate then determines whether or not the blocking pulses cover the re-shaped output pulses from the magnetostrictive delay line in this new position of the tap.

The tap can be stepped from an initial to a final position on the delay line, which positions are spaced apart such that the output pulses in the variable delay line can be shifted in phase through almost three hundred and sixty degrees of the clock cycle time. If in each of the tap positions the logical AND circuit causes an output pulse to be produced, indicating the occurrence of excessive jitter in tap position, means are rendered effective for indicating to an operator that the magnetostrictive delay line has failed the jitter test. If in any one position of the variable tap the jitter AND gate determines that for a complete sequence of output pulses from the main pattern generator no excessive jitter condition was detected, then the AND gate together with other means will indicate to an operator that the magnetostrictive delay line has met the jitter specifications. When one delay line has been tested in this manner, the apparatus is reset to its initial condition for testing of the next magnetostrictive delay line.

It is a more specific object of the present invention to provide improved jitter test means which produce blocking pulses, the widths of which are a function of the jitter specifications, and which compares the blocking pulses with pulses corresponding to the output of the magnetostrictive delay line to determine whether or not said output meets jitter specifications.

The foregoing and other objects, features and advantages of the invention will be apparent from the following more particular description of a preferred embodiment of the invention, as illustrated in the accompanying drawings.

In the drawings:

FIG 1. diagrammatically illustrates the improved jitter test apparatus of the present invention;

FIGS. 2a–2d diagrammatically illustrate the improved apparatus of FIG. 1 in greater detail; and FIGS. 3–9 are timing charts which illustrate the manner in which the apparatus of FIGS. 2a–2d operate.

The automatic jitter test apparatus of FIG. 1 includes a reset and start circuit 1 for initiating operation of the apparatus. Prior to initiating the testing of each magnetostrictive delay line 4, certain of the circuits are reset to their initial start positions; and then the test cycle is started. However, reset connections will be shown only in the detailed drawings of FIGS. 2a–2d since they would merely confuse FIG. 1 if added.

The apparatus includes a conventional clock 2 which produces output pulses preferably at the frequency at which the magnetostrictive delay line 4 is intended to be operated, for example, two megacycles. The clock pulses are applied to a main pattern generator 3 by way of circuit 1 and a circuit 17. The generator 3 produces in the preferred embodiment pulse trains having sixteen pulse or bit positions. The trains are produced in a sequence such that all possible combinations of the sixteen bits are produced so that maximum jitter conditions in the output of the magnetostrictive delay line 4 are assured. The pulse trains from the pattern generator are applied directly to the input of the delay line under test.

The output of the delay line 4 is applied to one or both of a pair of pulse width standardizing circuits 5 and 6. The circuit 5 produces an output pulse of predetermined pulse width, for example, one hundred nanoseconds, in response to the positive-going edge of voltage changes in the delay line output. An inverter 7 is interposed between the delay line 4 and the circuit 6 so that the latter circuit will produce output pulses of one hundred nanoseconds in response to the negative transients in the delay line output voltage.

Only the circuit 5 is utilized when the delay line is to be operated in an RZ (Return-to-Zero) mode because in this instance only the positive-going leading edges of the output pulses from the delay line need be timed. In the NRZ (Non-Return-to-Zero) mode of operation, the phase of both the positive-going and negative-going transients in the delay line output are of importance. In most instances, it has been found that excessive jitter will not be found in the delay line output negative transients if it is not in fact excessive with respect to the positive transients. Consequently, in many cases only the circuit 5 need be used for NRZ operation.

The constant width output pulses from the circuits 5 and 6 are applied to an OR circuit 8 and the output of the OR circuit is applied to a jitter AND invert circuit 9.

The clock pulses are also applied to a variable delay line 15 which includes input and output terminals 13 and 14. The delay from input to output is slightly greater than the clock period. In the preferred embodiment, the delay line 15 is in the nature of a continuous coil with a movable tap 18, selectively delayed signals being derived from the tap. The position of the tap with respect to the beginning and end of the coil is controlled by a suitable stepping motor 16 such as one of these manufactured by the Superior Electric Company. The clock pulses are coupled to the delay line 15 by way of a circuit 17, the function of which is to assure the application of a full first clock pulse to the test circuits when a test is initiated. If only a portion of a first clock pulse is applied to the circuits, a potential error condition could arise.

The tap output 18 of the variable delay line is connected to the input of a blocking pulse generator 19 by way of a level detector 107. A manually adjustable calibrating delay device 20 is associated with the generator 19 so that each pulse received from the tapped output 18 produces, at the output of the blocking pulse generator, a positive pulse, the width of which equals the width of each output pulse from the circuit 5 plus the maximum amount of permissible jitter. The blocking pulse width may be varied according to jitter specification variations. This blocking pulse is applied to a second input of the jitter AND circuit 9.

A blocking pulse is produced during each clock cycle. Hence, in the absence of an excessive jitter condition and with the proper phasing of the blocking pulses by the variable delay line 15, the blocking pulses can "cover" respective re-shaped output pulses in the pulse trains from the circuits 5 and/or 6 in at least one position of the tap 18. That is, a positive blocking pulse will be formed during the entire time interval of each negative output pulse from circuits 5 and 6. If the jitter is excessive, however, the blocking pulse cannot "cover" all of the re-shaped output pulses from the circuits 5 and 6 in any position of the tap 18. This is illustrated in FIG. 7.

The jitter AND circuit 9 will not produce an output pulse during a complete sequence of pulse trains from the pulse generator 3 where the blocking pulses from the generator 19 have covered all of the output pulses produced by the circuits 5 and 6. However, the jitter AND circuit 9 does produce an output pulse each time that a respective blocking pulse does not "cover" any output pulse from the circuits 5 and/or 6.

The output of the jitter AND circuit is connected to an advance motor control circuit 25. In the preferred embodiment, circuit 25 produces a five millisecond output pulse in response to each output pulse from circuit 9 to cause a motor control circuit 26 to energize the motor 16 to advance the tap in the variable delay line 15 one step in the forward direction.

The output of the jitter AND circuit 9 is also coupled to a circuit 27, the function of which is to detect the presence or absence of a jitter condition during a complete pattern cycle ($2^{16}$ patterns) and to control a forward-reverse trigger 28. The condition of the trigger in one or another of its two stable states cooperates with the advance motor control circuit 25 and a reverse drive oscillator 31 to determine the forward or reverse direction in which the stepping motor 16 moves the tap in the delay line 15. The reset-start circuit 1 together with the trigger 28 controls a jitter test ready latch and lamp circuit 29. The circuit 29 cooperates with the trigger 28 and the circuit 25 in controlling the circuit 26 for advancing the motor 16.

A full pattern cycle timer 30 under the control of the main pattern generator 3 applies control pulses to the circuit 27 near the end of each complete sequence of pulse trains from the generator 3. If during the interval between two succeeding output pulses from the timer 30 (which indicate that a complete cycle of $2^{16}$ bits has been run), the jitter AND circuit 9 does not produce an output pulse indicative of an excessive jitter condition, the circuit 27 will produce an output pulse and energize a lamp (to be described below) indicating that the magnetostrictive delay line under test has met jitter specifications. This output pulse from the circuit 27 switches the trigger 28 which then cooperates with the reverse drive oscillator 31 to step the tap 18 in the reverse direction to its initial start position.

Reverse stop and forward stop detecting circuits 32 and 34 produce output pulses when the tap 18 reaches its start and end positions, respectively. These pulses set the trigger 28 to its forward and reverse states.

A pulse shaping circuit 33 produces an output pulse of short duration (e.g. fifty nanoseconds) for each odd numbered output pulse at the tap 18. The output of the pulse shaper 33 is applied to the circuits 32 and 34. The circuit 32 includes a pulse shaping circuit similar to circuit 33 which produces a pulse of short time duration (e.g. fifty nanoseconds) for each odd numbered clock pulse 2. The initial operating position of the variable tap 18 is detected by the circuit 32 when there is a coincidence condition between the output pulses from the pulse shaper circuit 33 and the output pulse of the pulse shaper within the circuit 32. The coincidence condition produces an output pulse in the circuit 32 for setting the trigger 28 to its forward state.

The circuit 34 is similar to circuit 32 and produces an output pulse upon coincidence of the output pulse from the circuit 33 and a pulse of short time duration (fifty nanoseconds) produced in response to each odd numbered clock pulse arriving at the end of the coil in the variable delay line 15. This coincidence condition indicates that the tap has reached the end of its forward travel. This pulse sets the trigger 28 in the reverse state which causes the motor 16 to return the tap to its initial operation position under the control of circuit 26 and oscillator 31.

A jitter detect latch and NO GO indicator circuit 35 is energized in the event that the trigger 28 is switched to its reverse state and the circuit 27 has failed to detect a "no jitter" condition in one of the positions of the tap 18. This condition is indicative of the failure of the delay line 4 to meet jitter specifications.

The more detailed circuits in FIGS. 2a–2d will now be explained.

The clock 2 is in the form of an oscillator producing square wave output pulses, preferably at the frequency rate at which the delay line under test is intended to operate, for example, two megacycles.

The reset-start circuit 1 of FIG. 2a includes start and reset push button switches 40 and 41. When manually actuated, the switches 40 and 41 momentarily apply a positive potential to gates 42 and 43 respectively. With the switch 40 actuated, a positive half cycle from the clock 2 renders the gate 42 effective to switch a start-reset trigger 44 to its start stable state in which it renders a positive AND invert circuit 45 effective to pass clock pulses.

With the switch 41 actuated, a positive half cycle from the clock 2 renders the gate 43 effective to switch the trigger 44 to its opposite or reset stable state. In this latter state, the trigger renders the AND circuit 45 ineffective. The output of the trigger 44 forms a negative reset line 47.

An inverter 46, connected to the output of the trigger 44, produces a complemented voltage level on a positive reset line 48.

When the trigger 44 is in the reset condition, lines 47 and 48 are at negative and positive potential levels respectively. When the trigger is in its start condition, lines 47 and 48 are at positive and negative potential levels respectively.

The full initial clock bit circuit 17 includes an invert circuit 102 having its input connected to the output of the AND invert circuit 45. The circuit 17 also includes a bistable trigger 103, a positive AND invert circuit 104 and an inverter driver 105.

When the reset button 41 is depressed to switch the trigger 44 to its reset condition, the reset line 48 goes positive to switch the trigger 103 to a state in which the output of the trigger 103 goes negative to open the AND invert circuit 104 and block succeeding clock pulses. When the start button 40 is subsequently depressed to switch the trigger 44 to its start condition, the next positive half cycle from the clock 2 is applied via the AND invert circuit 45 and inverter 102 to the trigger 103 to switch it to its opposite state. The output of the trigger goes positive to render the AND invert circuit 104 effective to pass clock pulses.

The trigger 103 requires a positive pulse of significant duration to switch it to its opposite state. Hence, if only a small portion of the first positive clock pulse is passed from clock 2 to the trigger 103 via circuits 45 and 102 incident to depressing the start button, the trigger will not switch until the next succeding full positive pulse is received.

The AND circuit 104 will produce a waveform which corresponds to the train of clock pulses but one hundred-eighty degrees out-of-phase. These pulses are applied to the inverter driver 105 to produce pulses $fx$ (FIG. 1a and FIG. 3) for application to the input terminal 13 of the variable stepping delay line 15, to the circuit 32, and by way of an inverter 95 to the pattern generator 3.

Figure 2B:
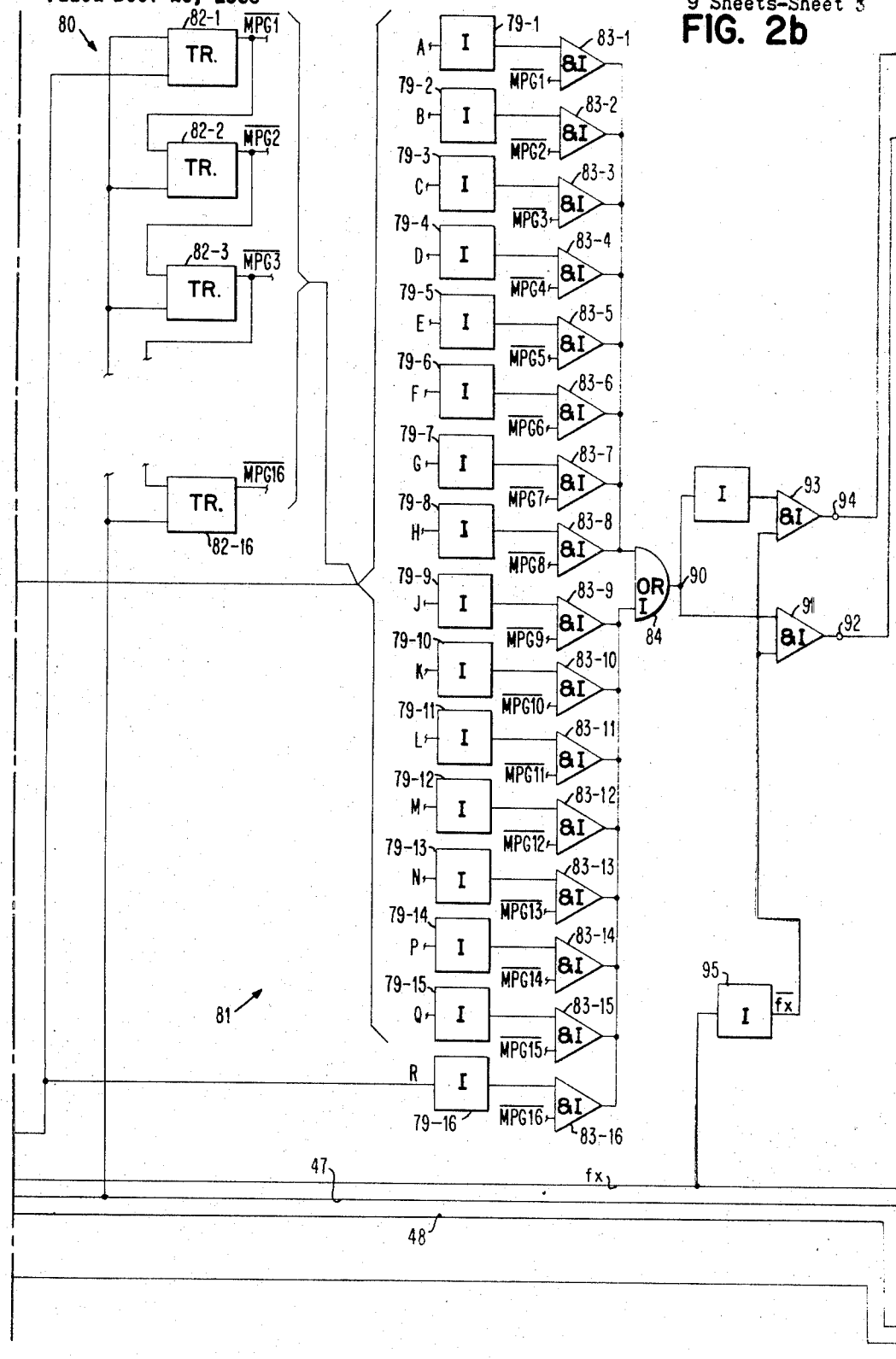
Figure 2C:
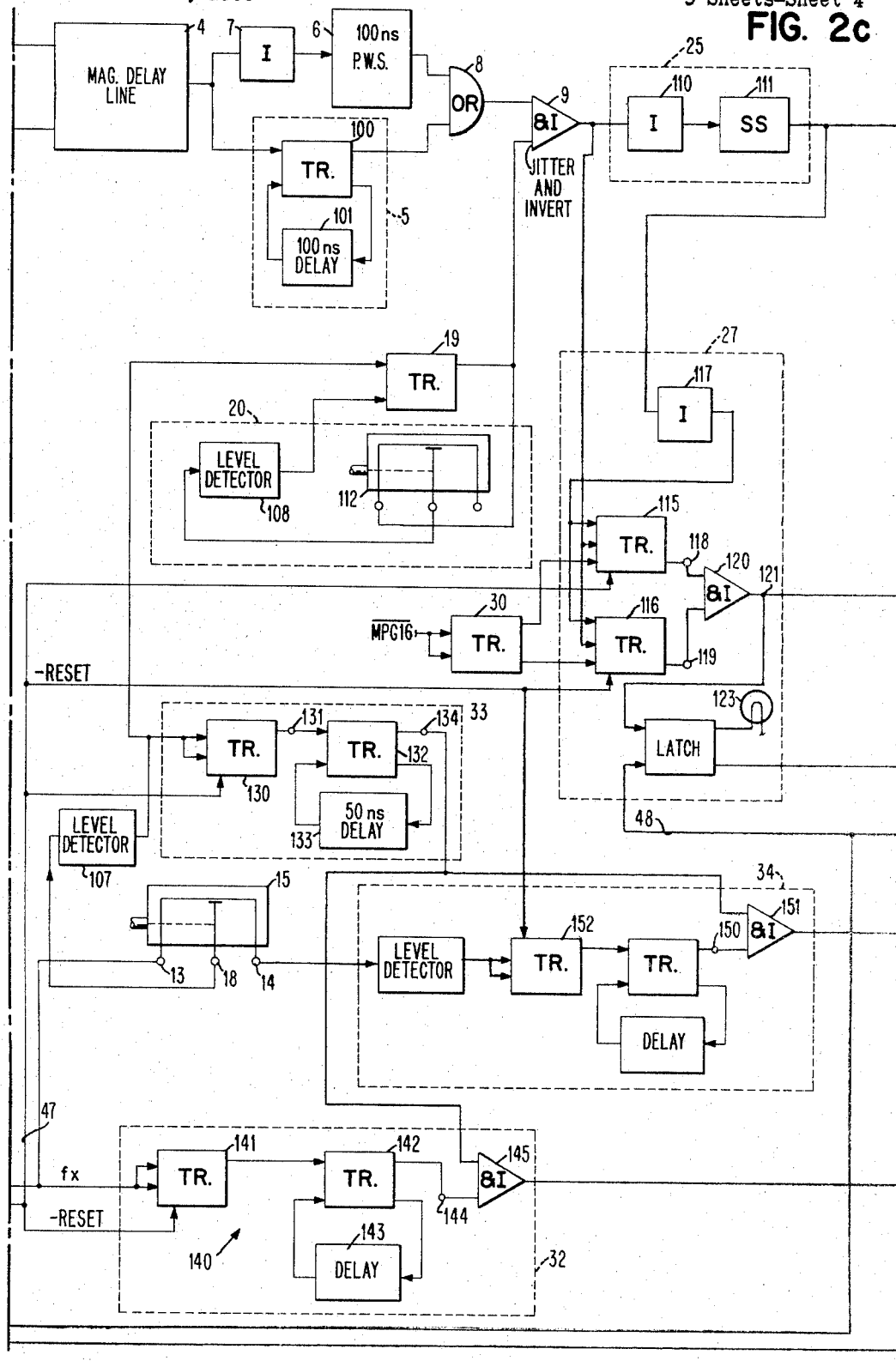

The pattern generator 3, FIGS. 2a and 2b, includes a four-bit binary counter 61 of conventional construction. The counter 61 includes four bistable triggers 62–65 inclusive. When the reset button 41 is depressed to cause the reset line 47 to go negative, each of the triggers is forced to a state in which the output lines T1, T2, T4 and T8 are positive and output lines $\overline{T1}$ to $\overline{T8}$ inclusive are negative. When the start button is depressed to couple clock-derived pulses $fx$ to the trigger 62, the triggers will be sequentially operated to produce output wave patterns as illustrated in the timing chart of FIG. 3.

Figure 3:
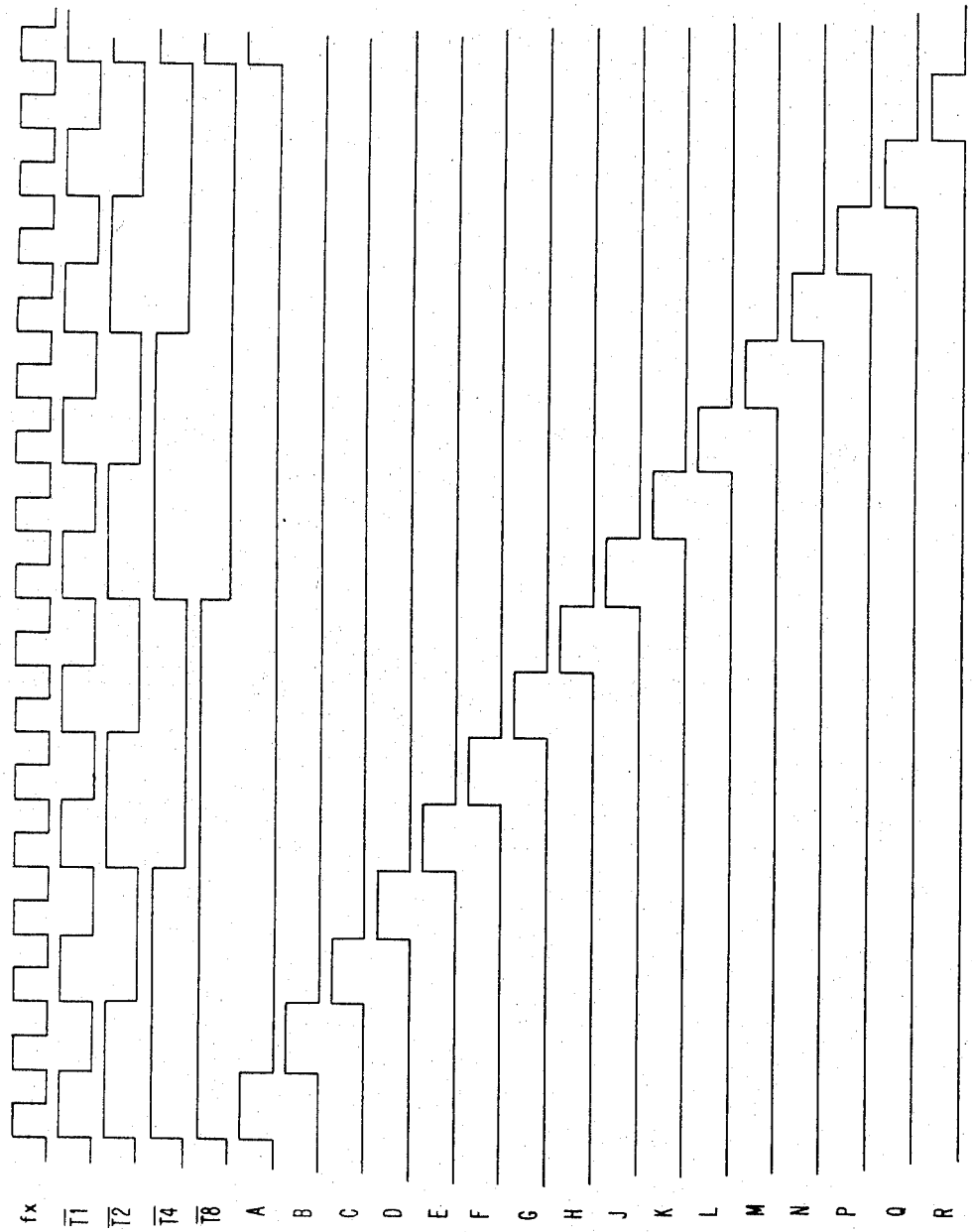

The outputs of the counter 61 are applied to a decode circuit 70 of the pattern generator 3, which decode circuit includes sixteen four-way AND circuits 71–1 to 71–16 inclusive. The outputs A–R inclusive of the AND circuits 71–1 to 71–16 are illustrated in FIG. 3.

The pattern generator 3 also includes a conventional sixteen position binary counter 80 and a serializing circuit 81 (FIG. 2b). The counter 80 includes sixteen triggers 82–1 to 82–16, only five of which are shown. The output R of the clock decode circuit 70 is connected to the input of the trigger 82–1. When the reset button 41 is depressed causing the reset line 47 to go negative, the trigger 82–1 is set to that stable state in which its output $\overline{MPG1}$ is negative and all other triggers 82–2 to 82–16 inclusive are set to that state in which their outputs $\overline{MPG2}$ to $\overline{MPG16}$ are positive, as illustrated in the timing chart of FIG. 4.

Figure 4:
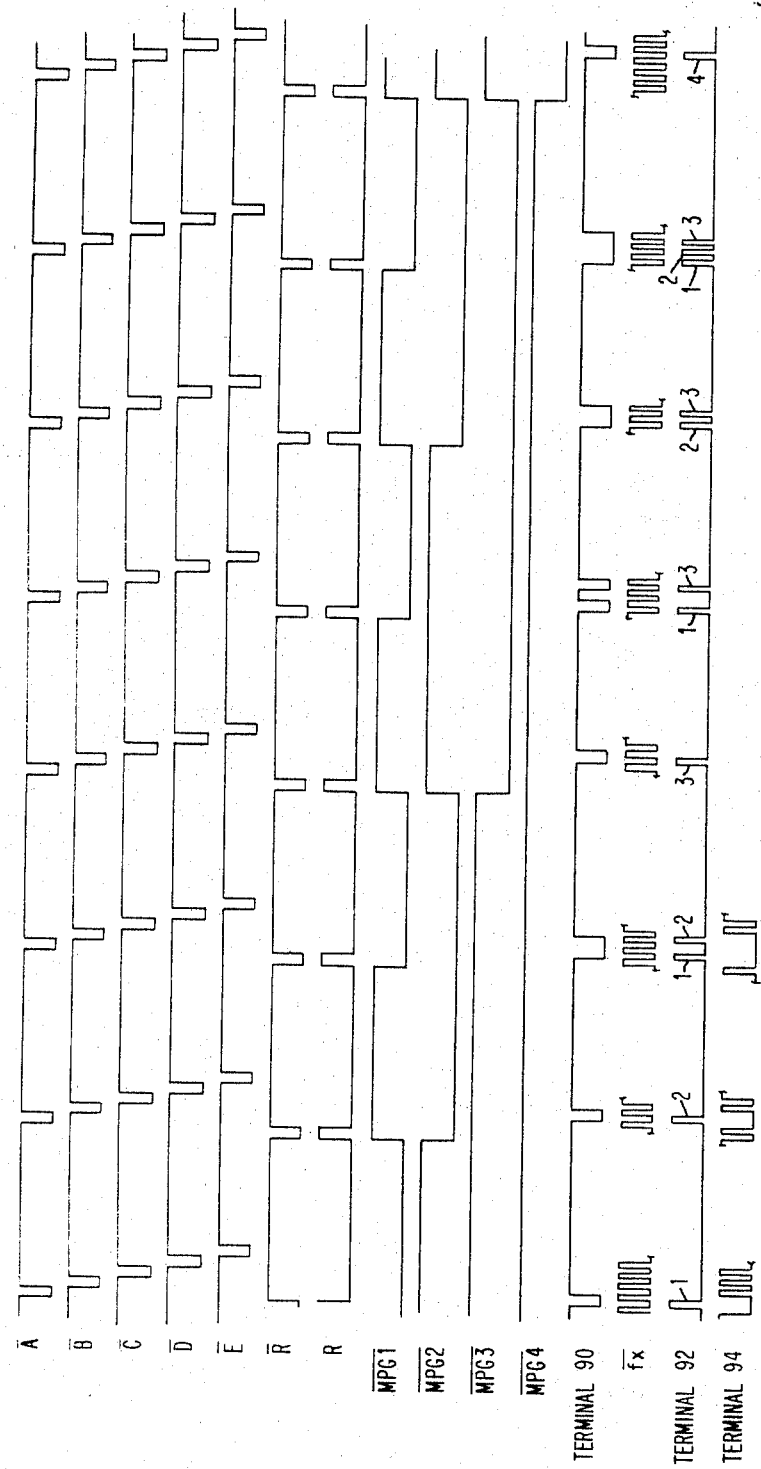

When the start button is depressed subsequent to resetting to initiate testing of the delay line, the first and each succeeding R bit from the clock decode circuit 70 advances the counter 80 to produce outputs illustrated in part in FIG. 4. That is, the trigger 82–1 responds to each R bit to switch to its opposite state; trigger 82–2 responds to the first R bit and each odd numbered R bit to switch to its opposite state; trigger 82–3 responds to the third R bit and every fourth R bit thereafter to switch to its opposite state, and so on.

The A–R output pulses are each inverted to form complemented outputs $\overline{A}$ to $\overline{R}$ by inverters 79–1 to 79–16.

The outputs $\overline{MPG1}$ to $\overline{MPG16}$ inclusive together with the $\overline{A}$ to $\overline{R}$ pulses are applied to various inputs of logical AND invert circuits 83–1 to 83–16 of the serializing circuit 81 as illustrated in FIG. 2b. The outputs of the circuits 83–1 to 83–16 are applied to a logical OR invert circuit 84. The circuit 81 produces at the OR invert output terminal 90 pulses illustrated in part in FIG. 4. These pulses are ANDED with the clock-derived pulses $\overline{fx}$ by an AND invert circuit 91 to produce a first train of pulses at the output terminal 92 for application to the magneto-strictive delay line. The pulses at the terminal 90 are also inverted and ANDED with the clock-derived pulses $\overline{fx}$ by an AND invert circuit 93 to produce a second train of pulses at the output terminal 94 for application to the magnetostrictive delay line. Both pulse trains are illustrated in part in FIG. 4. These are the pulse patterns applied to the delay line under test to produce maximum jitter.

In the event that the magnetostrictive delay line is one which is normally operated in the RZ mode, only the pulses appearing at the terminal 92 are applied thereto. However, in the event that the magnetostrictive delay line is normally operated in the NRZ mode, then both pulse trains at the terminals 92 and 94 can be applied to the input circuits of the magnetostrictive delay line in a known manner. That is, a first pulse at either output terminal 92 or 94 in the NRZ application will switch a trigger (not shown) to one state to drive the magnetostrictive delay line, but succeeding pulses on that same terminal will have no effect on the trigger until after pulses are received on the other terminal. The next pulse at the opposite terminal 92 or 94 will switch the trigger to the opposite state, thus providing NRZ inputs to the magnetostrictive delay line.

The output of the magnetostrictive delay line 4 is applied to the pulse width standardizer circuits 5 and 6. The circuit 5 includes a trigger 100 which is set to one of its two stable states by each output pulse from the delay line 4. One hundred nanoseconds later the trigger 100 is reset to its initial stable state by means of a delay circuit 101.

The construction of the circuit 6 is similar to that of 5. The outputs of circuits 5 and 6 are applied to the logical OR circuit 8, the output of which is applied to one input of the jitter AND invert circuit 9.

The tapped output terminal 18 of the variable delay line is applied to a level detector 107. The output of the level detector is connected to the blocking pulse generator 19, which is in the form of a bistable trigger, and to the circuit 33. Each output pulse change of one polarity from the detector 107 switches the trigger 19 to one of its two stable states, and a predetermined time interval later, the calibrated delay circuit 20 applies a pulse to the trigger 19 to switch the trigger to its initial stable state. The circuit 20 includes a manually adjustable delay line 112 and a level detector circuit 108. Thus the trigger 19 applies a positive-going blocking pulse of predetermined width to the jitter AND invert circuit 9 during each clock cycle time. The phase of this blocking pulse is determined by the position of tap 18.

The advance motor control circuit 25 includes an inverter 110 and a single shot multivibrator 111. In response to each positive-going output pulse from the jitter AND circuit 9, the single shot 111 produces a five millisecond negative-going pulse for advancing the motor 16 one step.

The full pattern cycle timer 30 is in the form of a bistable trigger which switches from one of its two stable states to the other in response to each succeeding $\overline{MPG16}$ pulse from the main pattern generator 3. Thus the trigger 30 changes state only after the main pattern generator has produced a complete series of pulse trains corresponding to all possible combinations of a sixteen bit train.

The no jitter detection circuit 27 includes a pair of bistable triggers 115 and 116 having set inputs connected to the output of the jitter AND circuit 9, reset inputs connected to the outputs of the trigger 30 and set-conditioning inputs connected to the output of the single shot 111 by way of an inverter 117. Whenever the single shot 111 produces a negative-going output pulse, it conditions the triggers 115 and 116 for being switched by the next output pulse from circuit 9 to cause output terminals 118 and 119 to go positive. However, each positive-going transient from either output of the trigger 30 switches its respective trigger 115 or 116 to the opposite state so as to produce at its respective output terminal 118 or 119 a negative voltage level. If at any time both terminals 118 and 119 are negative, a logical AND invert circuit 120 produces a positive pulse at its output terminal 121. As will be seen below, this positive pulse is applied to the trigger 28 by way of OR circuit 160 to switch the trigger to its reverse state, thereby initiating return of the tap 18 to its initial position adjacent input 13.

The positive pulse is an indication that the delay line 4 has met the jitter specifications. It results from at least a complete series of pulse trains from the main pattern generator 3 being applied to the magnetostrictive delay line 4 and all of the re-shaped output pulses from the delay line 4 being completely "covered" by the blocking pulses from the blocking pulse generator 19 while the delay line tap 18 is in one set position. During this complete series of pulse trains the jitter AND circuit 9 will not have produced a positive-going output pulse, the single shot 111 will not have produced a negative-going output pulse and the $\overline{\text{MPG16}}$ input to the trigger 30 will have caused the trigger to switch to one state to produce a positive-going output pulse on one output and then to switch to the other stable state to produce a positive-going output pulse on the other output terminal. The positive-going output pulses from the trigger 30 will have switched one of the triggers 115 or 116 to its reset state and then the other trigger to its reset state. With the triggers 115 and 116 in their reset states, the circuit 120 produces the positive-going output pulse. This positive pulse will cause a bistable latch 122 to energize a lamp 123 which indicates to an operator that the delay line 4 under test has met specifications. It also prevents operation of circuit 35 when the trigger 28 is switched to its reverse state.

The pulse shaping circuit 33 includes a bistable trigger 130 which has its input connected to the output of the level detector 107. Each output pulse from the tap 18 causes the detector 107 to produce a positive pulse to switch the trigger 130 to the opposite one of its two stable states. Each positive-going voltage transient at the output terminal 131 of the trigger 130 switches a second trigger 132 to a predetermined one of its two stable output states. Fifty nanoseconds later the trigger 132 is switched to its initial stable state by means of a feedback circuit including a delay circuit 133. Thus the trigger 132 produces negative pulses of very short time duration (fifty nanoseconds) at its output terminal 134 for alternate clock cycles at the tap output 18 of the variable delay line 15. This is illustrated in FIG. 6.

Circuit 32 includes a pulse shaping circuit 140 having triggers 141 and 142 and a delay circuit 143. The triggers 141 and 142 operate in a manner similar to that of triggers 130 and 132 and produce at output terminal 144 a negative pulse of short time duration (fifty nanoseconds) in response to alternate $fx$ pulses at the input 13 of the variable delay line 15. Waveforms illustrating the output pulses at the terminal 144 relative to the $fx$ pulses are illustrated in FIG. 6

Pulses at the output terminal 144 are applied to one input of a logical AND invert circuit 145. The other input of the circuit 145 is connected to the output 134 of the pulse shaping circuit 33. As illustrated in FIG. 6, the circuit 145 will produce a positive output pulse only when the output pulses at the terminals 134 and 144 are coincident. This coincidence condition occurs only when the movable tap in the variable delay line 15 is in its reverse stop position. This reverse stop position of the tap is also the initial position of the tap when testing of the delay line 4 is started.

Circuit 34 is similar to circuit 32 and produces, at a trigger output terminal 150, fifty nanosecond pulses in response to alternate clock-derived pulses appearing at the output 14 of delay line 15. It can be seen in FIG. 6 that the input-to-output delay through the delay line 15 is somewhat greater than the clock cycle time, for example, approximately seven hundred nanoseconds.

When there is coincidence between the output pulses at terminals 134 and 150, a logical AND invert circuit 151 produces a positive-going output pulse. This occurs when the tap 18 has been advanced in the forward direction to a position in which it is close to the output terminal end of the delay line 15.

The output pulse from circuit 151 switches the trigger 28 to condition the motor control circuit 26 for returning the tap 18 to its initial position adjacent input 13.

Figure 2D:
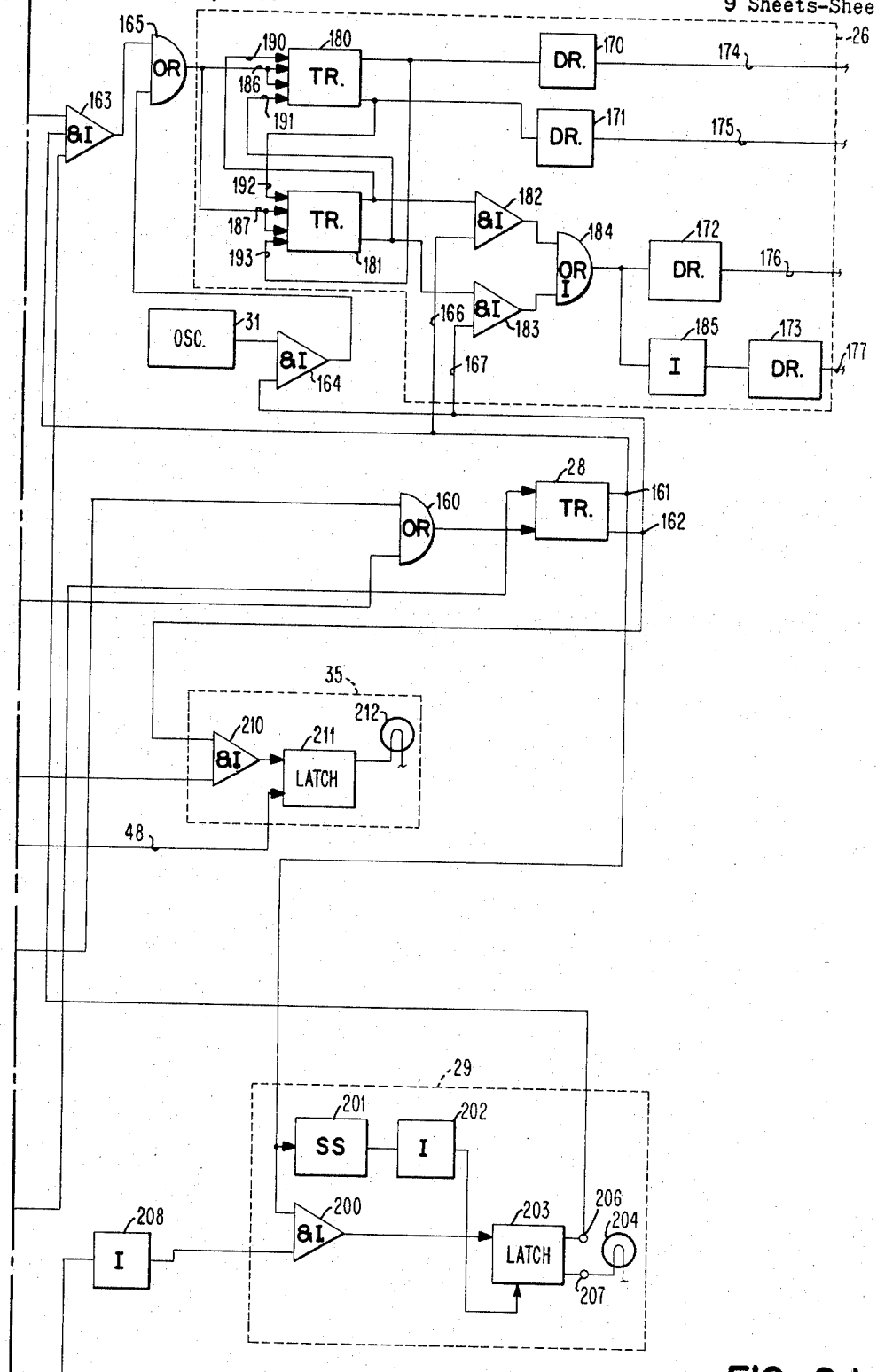

The motor control circuit 26, FIG. 2d, is selectively controlled by a forward-reverse trigger 28 in conjunction with the advance motor control circuit 25, circuit 29 and the reverse drive oscillator 31.

When the trigger 28 is in a first or forward stable state and the circuit 29 is conditioned by operation of the start switch 40, they cause the control circuit 26 to advance the motor 16 (FIG. 1) one step to increment the tap 18 one step to the right (FIG. 1) in response to each output pulse from circuit 25.

When the trigger 28 is in its second or reverse stable state, it causes the circuit 26 to move the motor 16 one step in the reverse direction to increment the tap 18 one step to the left (FIG. 1) in response to each negative output pulse from the oscillator 31.

The trigger 28 is switched to its forward state each time that the circuit 32 produces an output signal, i.e. when the tap 18 reaches its initial position adjacent input terminal 13 after having been stepped in the reverse direction from a position adjacent the output terminal 14.

The trigger is forced to its reverse state (1) in the event that circuit 27 produces an output pulse at terminal 121 including that a magnetostrictive delay line has met the jitter specifications during test, or (2) when the circuit 34 produces an output pulse incident to the tap 18 reaching its left-most position adjacent the output terminal 14. The logical OR circuit 160 couples the circuits 34 and 27 and the reset line 47 to the trigger 28 for switching the trigger to its reverse state.

One output 161 of the trigger 28 is connected to one input of an AND invert circuit 163. The circuit 163 includes a second input connected to the output of the advance motor control circuit 25 and a third input connected to the output of the circuit 29.

A second output 162 of the trigger 28 is connected to one input of a logical AND circuit 164. A second input of the circuit 164 is connected to the output of the reverse drive oscillator 31.

Thus the trigger renders circuit 163 or circuit 164 effective for coupling drive pulses to the motor control circuit 26 via a logical OR circuit 165. In addition, the trigger 28 has two additional connections 166 and 167 which, as will be seen below, control the direction of the stepping motor 16.

Figure 8:
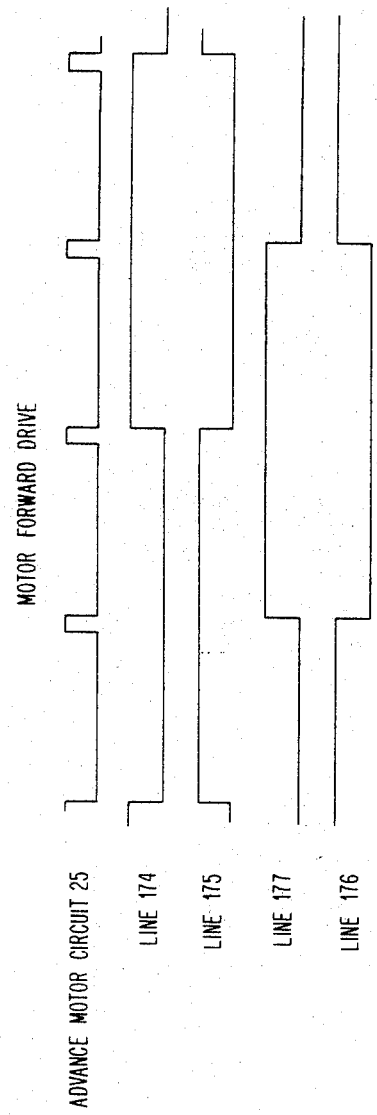
Figure 9:
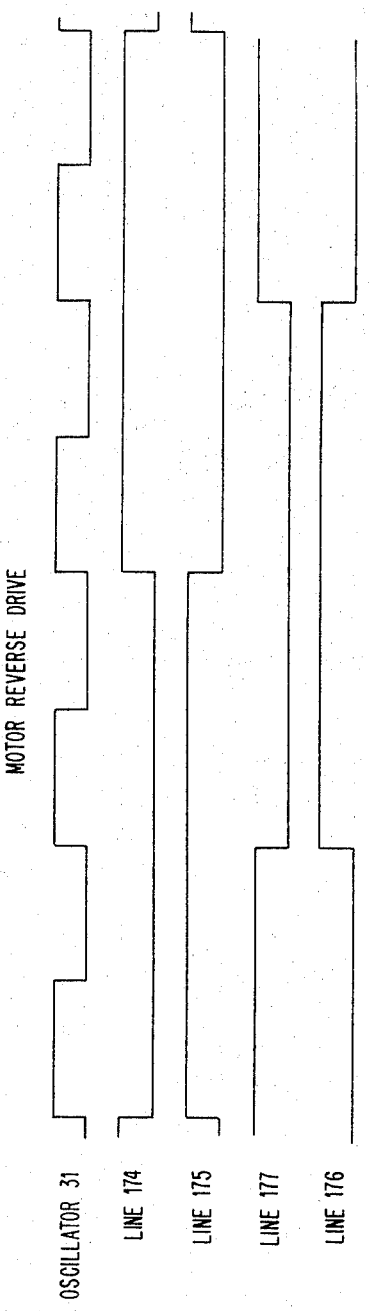

The motor control circuit 26 comprises four inverter drivers 170–173 having output lines 174–177 connected to the winding of the motor 16. As illustrated in FIGS. 8 and 9, the sequential order in which the operating conditions of the drivers 170—173 are changed determines the direction in which the armature (not shown) of the motor 16 is rotated step by step.

The operating states of the drivers 170–173 are determined by circuit means including a pair of bistable triggers 180 and 181, a pair of logical AND invert circuits 182 and 183, a logical OR invert circuit 184 and an inverter 185.

The triggers 180 and 181 have inputs 186 and 187 connected to the output of OR circuit 165. The complemented outputs of each trigger are cross-coupled to respective gate conditioning inputs 190, 191 and 192, 193. These gates are typical of conventional A.C. (alternating current) coupled triggers. For example, let us assume that the or circuit applied positive pulses to the triggers 180 and 181. This positive pulse together with a positive potential existing on one of the conditioning inputs 190 or 191 will cause the trigger 180 to switch to a specific one of its two stable states. However, if the trigger 180 is already in that state, the trigger is not affected. The trigger 181 is operated in a similar manner. The effect of the cross-coupling is to cause a first pulse from circuit 165 to switch one trigger, a second pulse to switch the other trigger, a third pulse to switch the one trigger again, a fourth pulse to switch the other trigger, and so on.

This operation of the triggers 180 and 181 causes the state of the drivers 170 and 171 and the voltage levels of their output lines 174 and 175 to change cyclically in response to alternate input pulses from the OR circuit 165. This is illustrated in FIGS. 8 and 9.

The circuits 182 and 183 are connected to respective complemented outputs of the trigger 181. Circuit 182 is rendered effective by the trigger 28 via connection 166 when it is desired to operate the motor 16 in the forward direction (FIG. 8) to move the tap 18 from left to right. Circuit 183 is rendered effective by the trigger 28 via connection 167 when it is desired to operate the motor in the reverse direction (FIG. 9) to move the tap 18 from right to left.

The effective circuit 182 or 183 controls the operating state of the driver 172 by way of the circuit 184 and the state of the driver 173 by way of the circuits 184 and 185.

The jitter test ready latch and lamp circuit 29 comprises a negative AND invert circuit 200, a single shot 201, an inverter 202 and a bistable latch 203. The output terminal 161 of the forward-reverse trigger 28 is connected to inputs of the AND circuit 200 and the single shot 201. The other input of the AND circuit 200 is connected to the armature 40a of the start button 40 by way of an inverter 208. The latter input of the AND circuit 200 is normally positive and is forced to a negative potential level only while the start button 40 is depressed.

Output terminals 206 and 207 of the latch 203 are connected respectively to an input of the logical AND invert circuit 163 and to a lamp 204 respectively. When the lamp 204 is energized, it indicates that the test apparatus is in its reset state with the tap 18 in its start position and ready for conducting a test on the next magnetostrictive delay line to be tested. When the start button is depressed, the lamp 204 is extinguished; and the circuit 163 is conditioned for forward stepping of the motor 16 during jitter tests on the magnetostrictive delay line.

The manner in which the circuit 29 operates will now be described in greater detail.

While the tap 18 is periodically stepped in the reverse direction after testing of a delay line 4, the trigger 28 applies a positive potential to the inputs of the circuits 200 and 201. The circuit 200 applies a negative potential to the latch 203 while the circuit 202 normally applies a negative potential to the latch. The outputs 206 and 207 are negative and positive respectively.

When the tap 18 reaches its initial start position, the trigger 28 is switched to apply a negative potential to the single shot 201 and the AND circuit 200. Since the other input of the AND circuit is positive, its output does not change. However, the single shot responds to the negative transient to produce a negative output pulse of short duration. This pulse is inverted by 202 and applied to the latch 203 to force it to its opposite state to cause the outputs 206 and 207 to be positive and negative respectively. The AND circuit 163 is rendered ineffective by the positive potential on output 206 and the lamp 204 is energized. The latch 203 remains in this state until the start button is depressed.

When the delay line 4 (which has been tested) is removed and the next delay line 4 is connected for testing, the reset button is depressed momentarily, then the start button is depressed momentarily to cause inverter 208 to apply a momentary negative potential to the AND circuit 200. With both inputs negative, the circuit 200 produces a momentary positive output pulse to switch the latch 203 to its opposite state. The lamp 204 is extinguished, and the output 206 goes negative to render the AND gate 163 effective. Testing of the delay line begins.

The latch is not switched until the trigger 28 is again switched to its forward position after the tap 18 is advanced during testing and returned to its initial position after testing. The single shot 201 responds only to negative-going transients and, therefore, does not respond to switching of the trigger 28 from its forward state to its reverse state.

The circuit 35 (FIG. 2d) includes a negative AND invert circuit 210, a bistable jitter latch 211 and an indicator lamp 212. The function of the circuit 35 is to apprise an operator of the fact that a complete test was performed upon a delay line 4 and that the delay line failed to meet jitter requirements.

To achieve this function, the AND invert circuit 210 responds to switching of the trigger 28 to its reverse state (after the tap has been advanced through all positions) only if the no jitter latch 122 (FIG. 2c) has not been switched to its set state. It will be recalled that the latch 122 is switched to its set state if the triggers 115 and 116 and the AND invert circuit 120 fail to detect an output from the jitter AND circuit 9 during the application of a complete set of pulse trains to the delay line 4.

In its set state, the no jitter latch 122 applies a positive potential to the AND invert circuit 210 to prevent switching of the jitter latch 211 when the trigger output 162 goes negative. In its reset state, the latch 122 applies a negative potential to circuit 210 to condition it for switching the latch 211. When the latch 211 is switched to its set condition, it energizes the lamp 212.

Operation of the apparatus to test a delay line 4 is as follows. The delay line 4 is suitably connected to the outputs 92 and 94 of the pattern generator 3 and to the pulse standardizers 6 and 7. The lamp 204 of the jitter test ready circuit 29 is energized to indicate to the operator that the apparatus is ready for conducting a test. The tap 18 of the variable delay line 18 is in its initial position.

The operator first momentarily actuates the reset switch 41 to switch the trigger 44 to its reset state. In this state, the trigger opens the AND circuit 45; and a negative reset potential is applied over line 47 to force the triggers 62–65 and 82–1 to 82–16 to their reset conditions. This negative potential also resets triggers 115, 116, 130, 141 and 152. Note that trigger 152 is set to a state different than trigger 130 to avoid any possible coincidence output pulses at terminals 134 and 150.

A positive reset potential on line 48 resets trigger 103 and latches 122 and 211.

The start switch 40 is momentarily actuated by the operator to switch the trigger 44 to its start state. The switch 40 also causes the inverter 208 to apply a negative pulse to the AND invert circuit 200 to switch the latch 203 to its opposite state. The lamp 204 de-energizes, and the output 206 goes negative to condition the AND invert circuit 163.

The trigger 44 conditions the AND invert circuit 45 and clock pulses are passed through circuits 45, 102, 104 and 105. The $fx$ pulses appearing at the output 105 are applied to the generator 3 to produce the desired output pulse patterns. The patterns are applied to the delay line 4 while the $fx$ pulses are applied to the variable delay line 15.

With the tap in its initial position, the blocking pulses are compared with the standardized delay line output pulses in the jitter AND circuit 9. If any of the standardized pulses in a complete set of pulse patterns are not "covered" by corresponding blocking pulses, the circuit 9 produces output pulses which cause the advance motor control circuit 25 to produce an output pulse. This pulse actuates the motor control circuit 26, and the motor 16 advances the tap one step.

The tap 18 is advanced step by step in this manner until one of two conditions occur: (1) a complete set of pulse patterns is "covered" by blocking pulses in one position of the tap 18, thereby preventing outputs from circuits 9 and 25, or (2) the tap 18 reaches the forward stop position in which case circuit 34 produces an output pulse to switch the trigger 28 to its reverse state.

When condition (1) occurs, circuit 27 energizes lamp 123 to indicate to the operator that the delay line 4 has met the jitter specifications; and circuit 27 causes the trigger 28 to be switched to its reverse state.

When condition (2) occurs, the trigger 28 causes the latch 211 to energize the lamp 212 to apprise the operator that the delay line 4 failed to meet jitter specifications.

In either event, when the trigger 28 is switched to its reverse state, it conditions circuit 164 to apply drive pulses from the oscillator 31 to the motor control circuit 26. The trigger 28 also conditions the circuit 183 to cause operation of the motor 16 to be in the reverse direction.

The motor 16 steps the tap 18 to its initial position at which time the circuit 32 produces an output pulse to switch the trigger 28 back to its forward state. Circuit 164 is rendered ineffective. The negative-going pulse at the trigger output 161 causes the single shot 201 of circuit 29 to switch the latch 203 to its initial state. The latch output 206 goes positive to render the circuit 163 ineffective and the output 207 goes negative to energize the lamp 204.

The lamp 204 indicates to the operator that the delay line 4 can be removed for replacement by the next delay line to be tested.

It will be appreciated that many circuit and procedural variations are possible. For example, the tap 18 can be moved manually or semi-automatically under direct operator control. Other pattern generators can be utilized.

What is claimed is:

1. The method of determining whether maximum jitter conditions in the output of a magnetostrictive delay line or the like meet device specifications, comprising the steps of
    applying a pattern of pulses to the delay line which pulses are selected ones of a train of pulses with a frequency substantially corresponding to that at which the delay line is intended for use to produce a substantially worse case jitter condition in a resultant train of output pulses,
    producing a train of standardized pulses of predetermined time duration substantially corresponding in phase to the train of delay line output pulses,
    producing constant time duration cyclical pulses at the above said frequency and having a time duration which is substantially equal to the sum of the time duration of a standardized pulse and the maximum jitter specification,
    selectively varying the phase of the cyclical pulses, and
    determining in each phase position of the cyclical pulses whether or not any standardized pulse in the pattern is initiated prior to the initiation of a corresponding cyclical pulse or is terminated after the termination of the cyclical pulse.

2. Apparatus for testing magnetostrictive delay lines or the like for excessive jitter comprising
    a source of clock pulses with a frequency substantially corresponding to that at which the delay line is intended for use;
    means applying certain ones of the clock pulses in a selected pattern to the delay line to produce an output pulse pattern exhibiting substantially maximum jitter,
    means responsive to said pattern of output pulses for producing a pattern of standardized width pulses substantially corresponding in phase to the output pulses,
    means producing additional constant time duration cyclical pulses at the clock frequency rate with a time duration which is substantially equal to the sum of the time duration of a standardized width pulse and the maximum jitter specification,
    means for selectively adjusting the phase position of said additional pulses at different positions within the clock period, and
    logical circuit means for detecting in each phase position of the cyclical pulses whether or not any standardized pulse in a complete pattern is initiated prior to the initiation of a corresponding additional pulse or is terminated after the termination of the additional pulse.

3. Apparatus for testing magnetostrictive delay lines or the like for excessive jitter comprising
    a source of clock pulses;
    means applying certain of the clock pulses in a selected pattern to the delay line to produce an output pulse pattern exhibiting substantially maximum jitter,
    means responsive to said pattern of output pulses for producing a pattern of standardized width pulses substantially corresponding in phase to the output pulses,
    means producing additional pulses at the clock frequency rate with a time duration which is substantially equal to the sum of the time duration of a standardized width pulse and the maximum jitter specification,
    means for selectively adjusting the phase position of said additional pulses within the clock period,
    logical circuit means for detecting in each phase position of the cyclical pulses whether or not any standardized pulse in a complete pattern is initiated prior to the initiation of a corresponding additional pulse or is terminated after the termination of the additional pulse; and
    means for indicating that the delay line has met the jitter specification incident to failure of the logical circuit means to detect, in at least one phase position of the additional pulses, neither the initiation of any standardized pulse in a complete pattern prior to the initiation of a corresponding additional pulse nor its termination after the termination of the corresponding additional pulse.

4. Apparatus for testing magnetostrictive delay lines or the like for excessive jitter comprising
    a source of clock pulses;
    means applying certain of the clock pulses in a selected pattern to the delay line to produce an output pulse pattern exhibiting substantially maximum jitter,
    means responsive to said pattern of output pulses for producing a pattern of standardized width pulses substantially corresponding in phase to the output pulses,
    means producing additional pulses at the clock frequency rate with a time duration which is substantially equal to the sum of the time duration of a standardized width pulse and the maximum jitter specification,
    means for selectively adjusting the phase position of said additional pulses within the clock period,
    logical circuit means for detecting in each phase position of the cyclical pulse whether or not any standardized pulse in a complete pattern is initiated prior to the initiation of a corresponding additional pulse or is terminated after the termination of the additional pulse; and
    means for indicating that the delay line has failed to meet the jitter specification incident to the logical circuit means detecting, in all phase positions of the tion of the cyclical pulses whether or not any standardized pulse in a complete pattern prior to the initiation of a corresponding additional pulse or alternatively the termination of at least one standardized pulse in a complete pattern after the termination of a corresponding additional pulse.

5. The apparatus of claim 3 together with
    means for indicating that the delay line has failed to met the jitter specification incident to the logical circuit means detecting, in all phase positions of the additional pulses, the initiation of at least one standardized pulse in a complete pattern prior to the initiation of a corresponding additional pulse or alternatively the termination of at least one standardized pulse in a complete pattern after the termination of a corresponding additional pulse.

6. Apparatus for testing magnetostrictive delay lines or the like for excessive jitter comprising a source of clock pulses;

means applying certain of the clock pulses in a selected pattern to the delay line to produce an output pulse pattern exhibiting substantially maximum jitter, means responsive to said pattern of output pulses for producing a pattern of standardized width pulses substantially corresponding in phase to the output pulses, means producing additional pulses at the clock frequency rate with a time duration which is substantially equal to the sum of the time duration of a standardized width pulse and the maximum jitter specification, means for selectively adjusting the phase position of said additional pulses within the clock period, logical circuit means for detecting in each phase position of the cyclical pulses whether or not any standardized pulse in a complete pattern is initiated prior to the initiation of a corresponding additional pulse or is terminated after the termination of the additional pulse;

a no jitter detect means producing an output pulse incident to failure of the logical circuit means to detect, in one phase position of the additional pulses, neither the initiation nor termination of any standardized pulse in a complete pattern prior to the initiation of or subsequent to the termination of a corresponding additional pulse, and means responsive to the last-mentioned output pulse for indicating that the delay line has met the jitter specification.

7. The apparatus of claim 6 further comprising jitter detect means rendered effective for indicating failure of the delay line to meet the jitter specification incident to failure of the no jitter detect means to produce an output pulse in all phase positions of the additional pulses.

8. The apparatus of claim 3 wherein the means for adjusting the phase position of the additional pulses comprises a variable delay line having an input terminal and having an adjustable tap; and a motor for moving the tap in either direction step by step between an initial position adjacent the input terminal and a final position adjacent the output terminal.

9. The apparatus of claim 3 wherein the standardized and additional pulses are of opposite polarity, and wherein the logical circuit means comprises an AND circuit for producing an output pulse each time that at least a portion of a standardized pulse is applied to one input thereof at an instant in time when a corresponding additional pulse is not applied to another input thereof.

10. The apparatus of claim 9 further comprising a forward-reverse bistable trigger for determining the direction in which the tap will be stepped, means effective upon the tap being moved into its final position for setting the trigger in its reverse state, means effective upon the tap being moved into its initial position for setting the trigger in its reverse state.

11. The apparatus of claim 10 further comprising a motor control means responsive to AND circuit output pulses for stepping the tap toward its final position when the trigger is in its forward state, and a reverse drive oscillator, said motor control means responsive to the oscillator when the trigger is in its reverse state for stepping the tap toward its initial position.

12. The apparatus of claim 11 further comprising a no jitter detect means producing an output pulse incident to failure of the AND circuit to produce an output pulse, in one phase position of the additional pulses, for a complete pattern of standardized pulses, means responsive to the last-mentioned output pulse for indicating that the delay line has met the jitter specification.

13. The apparatus of claim 12 further comprising jitter detect means rendered effective for indicating failure of the delay line to meet the jitter specification incident to failure of the no jitter detect means to produce an output pulse as the tap is advanced from its initial position to its final position.

References Cited

UNITED STATES PATENTS 3,059,179 10/1962 Heaton.
3,325,730 6/1967 Des Brisbay.

RUDOLPH V. ROLINEC, Primary Examiner

P. F. WILLE, Assistant Examiner

U.S. Cl. X.R.

328—112

PO-1050
(5/69)

UNITED STATES PATENT OFFICE
CERTIFICATE OF CORRECTION

Patent No. 3,473,114    Dated October 14, 1969

Inventor(s) William E. Houck et al

It is certified that error appears in the above-identified patent and that said Letters Patent are hereby corrected as shown below:

In the specification, Column 2, line 39, after "difficulty" the word "is" should read --in--.

In the claims, Claim 4, Column 14, line 68, "tion of the cyclical pulses whether or not any" should read --additional pulses, the initiation of at least one--.

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents